Dec. 26, 1961 H. H. JOHNSON 3,014,285
EDUCATIONAL DEVICES
Filed May 27, 1960 2 Sheets-Sheet 1
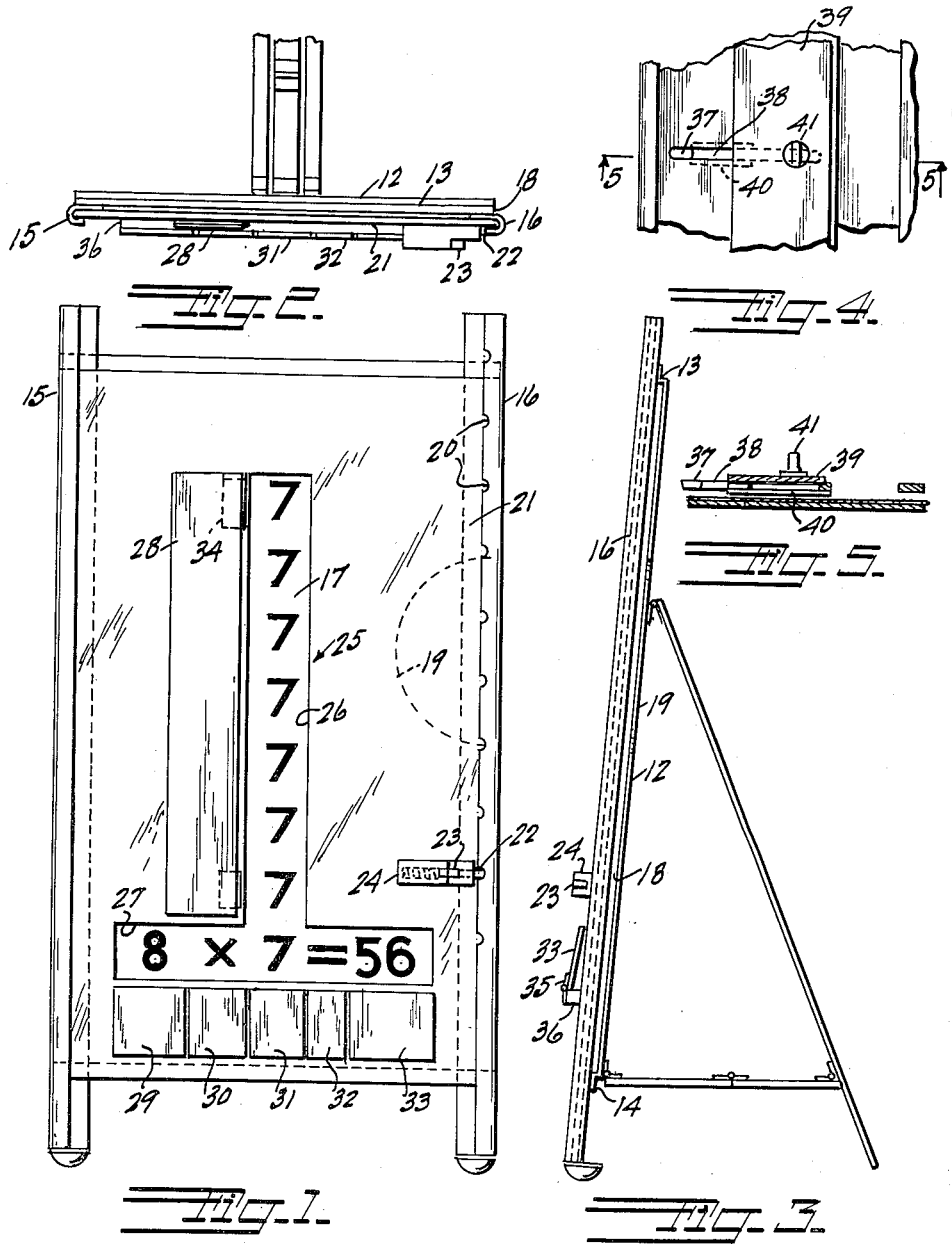
INVENTOR.
Henry H. Johnson
BY Philip A. Fuddell
Attorney Dec. 26, 1961     H. H. JOHNSON     3,014,285
EDUCATIONAL DEVICES
Filed May 27, 1960     2 Sheets-Sheet 2
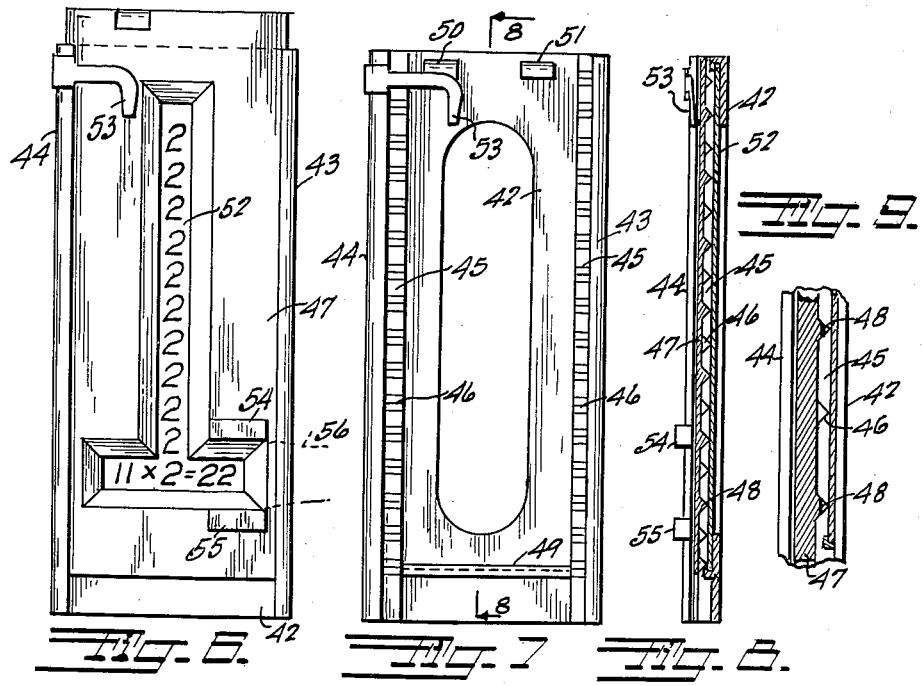
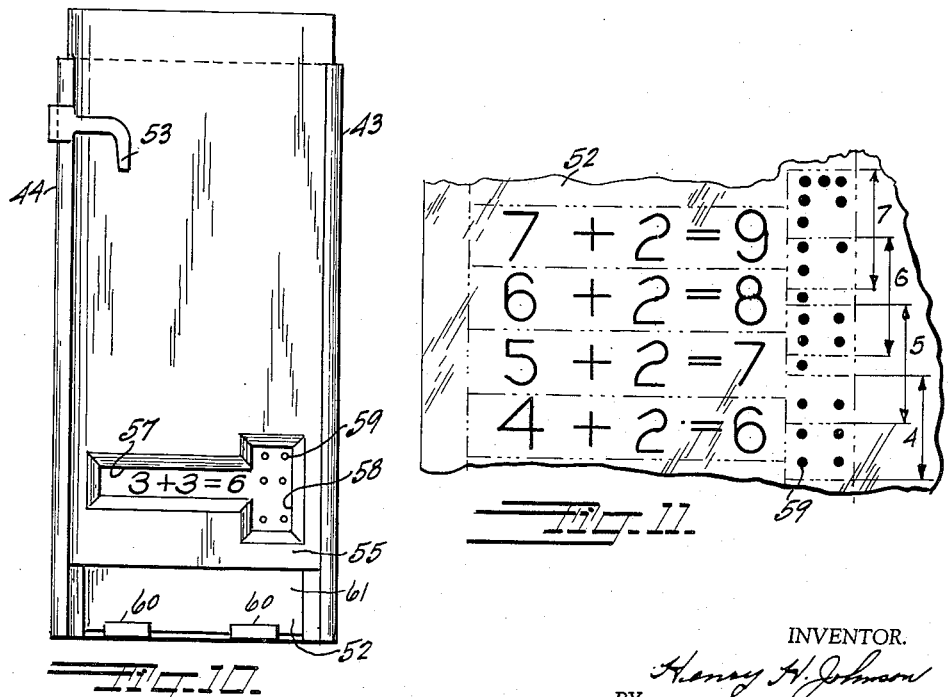
INVENTOR.
Henry H. Johnson
BY Philip A. Truedell
Attorney

United States Patent Office 3,014,285
Patented Dec. 26, 1961

3,014,285
EDUCATIONAL DEVICES
Henry H. Johnson, 494 58th St., Oakland 9, Calif.
Filed May 27, 1960, Ser. No. 32,423
10 Claims. (Cl. 35—31)

This invention relates to new and useful improvements in educational devices, particularly related to arithmetical calculations, and for use as practical teaching devices for schools as also in the form of educational toys for children.

This application is a modification of my application Serial Number 810,948, filed May 4, 1959, and issued January 3, 1961, Patent Number 2,966,747, for Educational Device, in connection with the main slide which is modified in this application to provide a device primarily arranged for teaching arithmetic.

The objects and advantages of the invention are as follows:

First, to provide an educational device which is adaptable for use in schools and also as a toy or game for children.

Second, to provide a device as outlined with interchangeable charts for conversion to various arithmetic problems.

Third, to provide a device as outlined which can be made in sizes for class teaching as also for children's use as a toy or game.

Fourth, to provide a device as outlined in which the various factors and arithmetic signs can be selectively concealed and disclosed at will for variations in the problems.

Fifth, to provide a device as outlined which is simple and easy to use, and economical to manufacture.

In describing the invention reference will be had to the accompanying drawings, in which:

FIG. 1 is a front elevation of the invention made in a size and type for class teaching, and provided with a multiplication chart, which is interchangeable with other problem charts.

FIG. 2 is a side elevation of FIG. 1.

FIG. 3 is a top view of FIG. 1.

FIG. 4 is a fragmentary front elevation showing a modification of the blind control means for selectively concealing the various elements of the problem.

FIG. 5 is a section taken on line 5—5 of FIG. 4.

FIG. 6 is a modification formed to a small scale for use as a toy or game for children.

FIG. 7 is also a front elevation, of FIG. 6 with the slide and chart removed.

FIG. 8 is a section taken through the vertical center of FIG. 6.

FIG. 9 is a fragmentary enlarged sectional view of the indexing means for FIG. 6.

FIG. 10 is a front elevation of a modification particularly and peculiarly adapted for problems in addition and subtraction.

FIG. 11 is an enlarged fragmentary view of a chart best adapted for addition and subtraction and used with the device shown in FIG. 10.

The invention, as adapted for class room use, consists of a back 12, the ends of which are stepped as indicated at 13 and 14 and which span and are fixed to the slide guides 15 and 16, with the charts 17 being insertible and replaceable through the passage 18, the back having a finger grip portion cut out on one side as indicated at 19. One of the slide guides is provided with a series of equally spaced notches 20 for properly indexing the slide 21 which is provided with a spring urged catch 22 which is retractable at will through the medium of the finger release 23, the housing 24 providing a grip member for raising and lowering the slide.

The slide 21 is provided with an inverted T-slot or window 25, the leg 26 of which reveals the number of digits in the answer as also the proof by addition, while the cross or head portion 27 of the window reveals the complete problem.

This slide can be used without any concealing means, though shown with blinds for selectively concealing the various elements of the problem as indicated at 28 for the vertical leg, and 29, 30, 31, 32 and 33 for the horizontal leg or head of the window, these blinds being shown as hinged to the slide as indicated at 34 and 35, the hinges 35 being mounted on a cleat 36 to maintain the blinds in concealing position.

This method of providing the blinds is subject to variations as shown in FIGS. 4 and 5 in which a transverse slot 37 is formed through the slide, and a cleat 38 is slidable in this slot and is secured to the blind 39 and has flanges 40 fixed to or integral with the cleat and cooperative with the underside of the slide, the slide being provided with a knob 41. Thus the blinds may be arranged to slide or swing into open and closing positions.

The types shown in the remaining FIGURES 6 to 10 are identical in many respects to the slide illustrated in the previously mentioned patent application, and includes a back 42 having a slide guide along each side as indicated at 43 and 44 with adjoining ridges 45 which are provided with a series of equally spaced grooves 46, the slide 47 having beads 48 engageable in these grooves. Suitable holding means such as a grooved cleat 49 and clips 50 and 51 are provided for removably holding the charts 52 in position under the slide, and a spring 53 urges the beads to engage in the grooves 46 for proper indexing.

Another type of blind is shown and consists of a pair of cleats 54 and 55 located respectively above and below one end of the transverse portion of the window, the spacing being such as to receive the end of a finger 56 for moving the slide and simultaneously covering the answer to the problem.

The type disclosed in FIG. 10 is particularly suited to problems in addition and subtraction, being identical in all respects to that shown in FIGS. 6 to 9 with the exception that the T-shaped window is located transversely instead of vertically, with the leg 57 revealing the entire problem with answer, while the head 58 provides the answer in the form of suitable symbols such as dots or circles 59. Clips 60 are provided for removably securing the chart 61 in position.

A fragmentary view of an addition chart is illustrated in FIG. 11, the dots being so arranged that certain dots appear for two different sums. For example, six dots are formed to be included within the head 58 as indicated in the span 4.

When the slide is moved to the next position, the upper two dots plus five additional dots are revealed through the head as indicated in the span 5. The next movement of the slide includes the four top dots of span 5 plus four additional dots as indicated at 6, thus the circles or dots can be made larger and more easily counted.

Any of these types can be provided with blinds as shown in FIGS. 1 to 5, and an educational device is thus provided which can be adapted for classroom use, as an educational device for children, and as a toy and game.

I claim:

1. An educational device comprising a slide, a back including guiding means for the slide and also including reception means for substitution and retention of charts provided with a series of arithmetic problems, said slide being adjustable in said guiding means and having a window formed therethrough through which said arithmetic problems are selectively visible, indexing means cooperative between said back and said slide for registering the window with the respective arithmetic problems, and a plurality of cover members adjustable on said slide for concealing selected elements of the problems visible through the window, at will.

2. A structure as defined in claim 1, said guiding means comprising a U-shaped member for each side of the back, said indexing means comprising a series of equally spaced recesses provided in one of said guides, and spring-urged engaging means on said slide selectively engageable in said recesses and having finger control means for manual retraction for release of the slide for adjustment at will.

3. An educational device comprising a back including a guide member mounted along each side of said back, and including holding means for a chart, a slide adjustable in said guide members and having a T-shaped window formed therethrough, indexing means cooperative between one of said guide members and said slide, and an arithmetic chart removably retained between said slide and said back and having a series of arithmetic problems including answers and selectively visible in said window through adjustment of the slide in the back.

4. A structure as defined in claim 3, cover means for each element of a problem and mounted on said slide in covering relation to the window and manually movable to two positions for concealing and revealing the respective elements of the problems selectively at will.

5. An educational device comprising a slide, a back, opposed guiding means for said slide and mounted on said back, with the back recessed for removably retaining a chart in position behind the slide, said slide being adjustable in said guiding means and having a window formed therethrough, manually releasable spring urged indexing means cooperative between said guiding means and said slide, an arithmetic chart having a series of arithmetic problems including answers selectively visible in said window through adjustment of the slide in the guiding means, and selective cover means on said slide manually movable to two positions for selectively concealing and revealing the respective elements of the problems including answers.

6. A structure as defined in claim 5, said indexing means comprising a series of recesses provided in said guiding means, and spring urged engaging means on said slide and manually operable for selective engagement in said recesses.

7. An arithmetic teaching device comprising a pair of spaced guides each having a front wall and a back wall, a back having its upper and lower ends forwardly offset with the offset portions fixed to said back walls to receive a chart therebetween, with the offset at the lower end providing a shelf for support of the chart, a slide slidable in said guides and including indexing means cooperative between said guides and the slide, and a window formed through said slide and having a width and height to selectively exhibit individual problems on the chart.

8. A structure as defined in claim 7, said indexing means comprising a series of equally spaced notches formed in the inner edge of one front wall and extending throughout the major portion of the height thereof, and a spring urged latch on the slide and including finger operable retraction means and engageable in said notches.

9. A structure as defined in claim 7, said window being of inverted T-shape having an upwardly projecting leg and a cross head at the lower end, and a blind for the upward projecting leg and a plurality of blinds for the head for selectively concealing selective elements of a problem disclosed through the head.

10. A structure as defined in claim 7, a plurality of blinds for said window and including one for each element in an arithmetic problem as exposed through the window for selectively or simultaneously concealing elements of the problem, and movably mounted on said slide, and a support cooperative with said back for supporting the device in a slightly rearwardly inclined position.

References Cited in the file of this patent

UNITED STATES PATENTS

| | | |
|---|---|---|
| 1,687,130 | Hunau et al. | Oct. 9, 1928 |
| 1,732,983 | Orchard | Oct. 22, 1929 |
| 1,745,674 | Hanna | Feb. 4, 1930 |
| 1,974,901 | Stadler | Sept. 25, 1934 |